(12) United States Patent
Blumentritt et al.

(10) Patent No.: US 9,956,959 B2
(45) Date of Patent: May 1, 2018

(54) METHOD FOR CONTROLLING A DELAY DEVICE OF A VEHICLE

(71) Applicants: VOLKSWAGEN AG, Wolfsburg (DE); AUDI AG, Ingolstadt (DE)

(72) Inventors: Marc Blumentritt, Braunschweig (DE); Martin Schwindl, Munich (DE); Stefan Jilg, Ingolstadt (DE)

(73) Assignees: VOLKSWAGEN AG (DE); AUDI AG (DE)

( * ) Notice: Subject to any disclaimer, the term of this patent is extended or adjusted under 35 U.S.C. 154(b) by 110 days.

(21) Appl. No.: 15/229,184

(22) Filed: Aug. 5, 2016

(65) Prior Publication Data

US 2017/0036677 A1 Feb. 9, 2017

(30) Foreign Application Priority Data

Aug. 6, 2015 (DE) .................. 10 2015 215 042

(51) Int. Cl.
*B60W 30/18* (2012.01)
*B60W 50/04* (2006.01)
(Continued)

(52) U.S. Cl.
CPC ......... *B60W 30/18109* (2013.01); *B60L 7/18* (2013.01); *B60T 8/172* (2013.01); *B60T 17/22* (2013.01); *B60W 50/045* (2013.01); *F02D 13/04* (2013.01); *B60L 2240/12* (2013.01); *B60T 2270/413* (2013.01)

(58) Field of Classification Search
CPC . B60W 30/18109; B60W 50/045; B60L 7/18; B60L 2240/12; B60T 8/172; B60T 17/22; B60T 2270/413; F02D 13/04
See application file for complete search history.

(56) References Cited

U.S. PATENT DOCUMENTS

2011/0172878 A1* 7/2011 Calnek ................. B60T 8/885
701/33.4

FOREIGN PATENT DOCUMENTS

DE 10248195 A1 4/2004
DE 102014209483 A1 11/2014
(Continued)

OTHER PUBLICATIONS

Search Report for German Patent Application No. 10 2015 215 042.9; dated Jun. 6, 2016.
(Continued)

*Primary Examiner* — Rodney A Butler
(74) *Attorney, Agent, or Firm* — Barnes & Thornburg LLP (57) ABSTRACT

A method for controlling a deceleration device of a motor vehicle, wherein a control apparatus receives a request signal from a vehicle component for vehicle deceleration. Protection against mistriggering of the deceleration device is provided. Also provided is an integrity level of the vehicle component to be ascertained, a time profile for a deceleration performance of the deceleration device obtained during a braking process to be ascertained, for different times, a respective current minimum integrity level that is at least necessary for the time profile ascertained hitherto to be ascertained, and performance limiting to be performed for the request signal if the current minimum integrity level is higher than the integrity level of the vehicle component.

25 Claims, 3 Drawing Sheets

(51) Int. Cl.
*B60T 17/22* (2006.01)
*B60L 7/18* (2006.01)
*B60T 8/17* (2006.01)
*B60T 8/172* (2006.01)
*F02D 13/04* (2006.01)

(56) References Cited

FOREIGN PATENT DOCUMENTS

| EP | 2851249 A1 | 3/2015 |
|----|------------|--------|
| WO | 2014094772 A1 | 6/2014 |

OTHER PUBLICATIONS

Search Report for European Patent Application No. 16179939.0; dated Nov. 14, 2016.

* cited by examiner

METHOD FOR CONTROLLING A DELAY DEVICE OF A VEHICLE

PRIORITY CLAIM

This patent application claims priority to German Patent Application No. 10 2015 215 042.9, filed 6 Aug. 2015, the disclosure of which is incorporated herein by reference in its entirety.

SUMMARY

Illustrative embodiments relate to a method for controlling a deceleration device of a motor vehicle. By way of example, the deceleration device can comprise an electrically controllable braking force booster for a friction brake and/or a generator for recuperating kinetic energy from the motor vehicle. The deceleration device is actuated by a control apparatus on the basis of a request signal from a vehicle component. The request signal is used by the vehicle component to request vehicle deceleration of the motor vehicle, which vehicle deceleration brakes the motor vehicle. Illustrative embodiments also include the control apparatus and a motor vehicle having the disclosed control apparatus.

BRIEF DESCRIPTION OF THE DRAWINGS

An exemplary embodiment is described below. In this regard.

DETAILED DESCRIPTION

In a motor vehicle, a braking process can be initiated not only by the driver by the brake pedal but also by a driving assistance system, DAS. By way of example, emergency braking can be triggered by a collision monitoring section of an emergency braking assistance system. A braking process by means of an engine brake, for example, can be requested by a controller for an ACC (automatic cruise control) to regulate a speed of travel of the motor vehicle to a setpoint speed. Within a driving assistance system, various driving functions can each generate request signals of their own for vehicle deceleration. For this reason, the text below refers not to driving assistance systems in general but rather to vehicle components, each vehicle component being able to be an entire driving assistance system or a program module or a program function within a driving assistance system.

Multiple vehicle components may be active in parallel without knowing of one another, that is to say without coordinating themselves with one another. To decide which request signal is implemented in the deceleration device at a given time, a control apparatus for the deceleration device is provided that has a communication interface via which the request signals are received. This control apparatus is also referred to as a braking controller. By way of example, the interface can be provided on a communication bus, for example, a CAN bus (CAN—controller area network) or a FlexRay bus. When a request signal from a vehicle component is received, the control apparatus initiates a braking process by setting the vehicle deceleration in the deceleration device on the basis of the request signal.

One problem with vehicle components that can trigger vehicle deceleration is their reliability or integrity. If a collision monitoring section triggers a false alarm, for example, then a request signal for full braking to a standstill can be generated, even though there is no reason for this. To avoid erroneous requests of this kind, a vehicle component that can trigger a drastic braking process of this kind needs to comply with a minimum integrity level, which may be described by what is known as the ASIL (automotive safety integrity level) according to the ISO 26262 standard, for example. In the case of a controller for an ACC, it is assumed that the controller will not request such drastic vehicle decelerations. For this reason, such a controller needs to comply with only a lower or lesser integrity level. If such a controller still generates a request signal for a dangerous braking process on account of a technical fault, however, then this request signal is implemented by the control apparatus of the deceleration device, which means that a technical fault in a controller for an ACC could still trigger, e.g., full braking. Since the controller for the ACC needs to comply with only a lower integrity level, corresponding technical faults or construction deficiencies have a higher probability of remaining undetected during the manufacture and checking of such a controller.

Disclosed embodiments provide, in a motor vehicle, a safety concept that can avoid erroneous triggering of a braking process by a driving assistance system.

Disclosed embodiments provide a method for controlling a deceleration device of a motor vehicle. The method is performed by a control apparatus that can be realized as a braking controller, for example. In the manner described, the control apparatus, at the beginning or during a braking process in which the deceleration device prompts braking or vehicle deceleration, receives a request signal from a vehicle component for the vehicle deceleration. By way of example, the request signal can indicate a braking torque that is intended to be used for braking. By way of example, the request signal can also indicate an acceleration value that indicates a negative acceleration, that is to say a deceleration. By way of example, a braking torque can be generated by means of a friction brake, which may be part of the deceleration device. The control apparatus is intended to set the vehicle deceleration in the deceleration device in accordance with the request signal.

So as now to ensure that the request signal from the vehicle component results in a plausible braking process, that is to say is not a false request on account of a technical fault or a misidentification or misinterpretation of the driving situation, the following additional operations are provided. The control apparatus ascertains an integrity level of the vehicle component. By way of example, it is thus possible for the described ASIL or integrity level to be ascertained. Furthermore, during the braking process, a time profile for a deceleration performance of the deceleration device that is obtained as a result of the vehicle deceleration is ascertained. The deceleration performance indicates what effect the deceleration device has exerted on the speed of travel of the motor vehicle hitherto during the braking process. The control apparatus repeatedly, that is to say for different times, ascertains a current, at least necessary, minimum integrity level each time for the time profile ascertained up to the respective time. In other words, a check is performed to determine what minimum integrity level a vehicle component needs to have so that it can use its request signal to continue or influence the further braking process. If the current minimum integrity level is higher than the integrity level of the vehicle component, then performance limitation is performed for the request signal from the vehicle component. The performance limitation therefore relates to the deceleration performance that is provided for the vehicle component. In other words, the vehicle component can, with its integrity level, set or request the vehicle deceleration only within a prescribed performance range, the performance range being defined by the current minimum integrity level. If the integrity level of the vehicle component corresponds at least to the minimum integrity level, on the other hand, then the vehicle deceleration can be set in the deceleration device in accordance with the request signal.

In the disclosed embodiments, a cross-component check on the request signal implemented or used is performed in the control apparatus, so that an implausible or improbable request signal is identified therein. The request signal is implausible, that is to say an indication of a fault or a misidentification within the vehicle component, if the request signal prompts a time profile for the deceleration performance that the vehicle component cannot trigger or cause at all in accordance with its integrity level. The minimum integrity level is also an assessment of the current driving situation, as ascertained or evaluated by the control apparatus on the basis of the time profile of the deceleration performance. In this case, the minimum integrity level indicates how critical the profile of the braking process hitherto was. Vehicle components having a lower integrity level are then no longer able to intervene in an already critical braking process.

The request signal may be a single control value, that is to say a trigger command for full braking, for example. The request signal may alternatively be a time signal that indicates a new value to be set for the vehicle deceleration for each of different times over time.

Disclosed embodiments also include optional developments whose features result in additional benefits.

According to one development, the performance limitation comprises the request signal being ignored or the time profile of the deceleration performance being limited to a performance limit prescribed by the current minimum integrity level by virtue of the vehicle deceleration requested by the request signal being decreased and only the decreased vehicle deceleration being set in the deceleration device if the vehicle deceleration requested by the request signal exceeds the performance limit. The request signal is ignored if the braking process has been initiated by another vehicle component, e.g., by a brake pedal operated by the driver. If the time profile hitherto has already been caused by the vehicle component and/or there is no other request signal, then the request signal from the vehicle component can be decreased in the manner described and the vehicle deceleration can be set in the deceleration device in accordance with the decreased request signal.

The deceleration performance described can comprise a deceleration value, for example, that is to say a negative acceleration. In one development, the deceleration performance comprises a speed reduction for the speed of travel of the motor vehicle since the beginning of the time profile. In other words, it is ascertained by what speed value the speed of travel has decreased since the beginning of the time profile. This is thus an accumulated speed reduction. Consequently, regardless of interim deceleration values, only the total prompted, that is to say effective, speed reduction is recorded. By way of example, the speed reduction can be ascertained on the basis of speed values that is able to be ascertained on the basis of wheel speeds or radar signals, for example, in a known manner.

According to one development, the integrity level indicates a probability of error for erroneous generation of the request signal. By way of example, such an integrity level is indicated by the ASIL already described. The integrity level is therefore thus a safety level or reliability level. To ascertain the integrity level of the vehicle component, there may be provision, by way of example, for the control apparatus to store a list or table that associates with the vehicle component its integrity level. By way of example, the vehicle component can be identified on the basis of its sender address that it uses when sending the request signal. Alternatively, for one or more or all vehicle components, there may be provision for the vehicle component(s) each to send its/their integrity level together with the request signal. Consequently, the integrity level of the vehicle component can change over time. By way of example, the vehicle component can set its integrity level on the basis of how reliably it has been able to identify or classify or rate a driving situation or traffic situation. This can be stipulated in a known manner, for example, on the basis of identification probabilities.

One development relates to the ascertainment of the minimum integrity level. In this development, a respective characteristic curve for the time profile of the deceleration performance is prescribed for multiple prescribed minimum integrity levels. This characteristic curve represents the highest admissible deceleration performance at each of the times. It is thus possible for a respective characteristic curve to be prescribed for various ASIL values, for example, that is to say a characteristic curve for ASIL-A, ASIL-B and ASIL-C, for example. Of the minimum integrity levels, the one whose characteristic curve has been exceeded by the ascertained time profile most recently is then selected as the current minimum integrity level. Thus, if the ascertained time profile exceeds the highest admissible value for the deceleration performance that is indicated by one of the characteristic curves, then the minimum integrity level set or selected is the one that is associated with this characteristic curve. Consequently, the characteristic curves can each describe a time dependency.

In accordance with one development, a hysteresis is provided for downgrading or decreasing the minimum integrity level. In this development, the current minimum integrity level is maintained until the ascertained time profile has dropped below the characteristic curve of the lower minimum integrity level. The lower minimum integrity level is then selected as the current minimum integrity level. "Current" means the respective time at which the time profile is evaluated in the manner described. The hysteresis results in the benefit that the execution or implementation of a request signal from a vehicle component having an integrity level lower than the current minimum integrity level is delayed until the driving situation has diffused or eased or developed toward a lesser minimum integrity level.

According to one development, during the braking process, a further request signal from a further vehicle component is ignored so long as the current minimum integrity level is higher than an integrity level of the further vehicle component. In other words, during the braking process, all those vehicle components whose integrity level is lower than the current minimum integrity level are disabled. Consequently, vehicle components having a lesser integrity level cannot cause unnecessary intensification of the driving situation in a critical braking situation or during a critical braking process that requires a higher minimum integrity level. The driving situation first needs to ease before these vehicle components are likewise borne in mind or considered again. The current minimum integrity level can be communicated or indicated or signaled to the coupled or connected vehicle components by the control apparatus in a return channel. This signals the performance range of the vehicle deceleration or of the braking in which the motor vehicle is currently situated.

One development considers that during the braking process, a vehicle component having a sufficiently high integrity level sends a request signal that requests greater vehicle deceleration than the request signal that is currently or instantaneously implemented by the deceleration device. In this development, during the braking process, of multiple received request signals, the one selected is the one received from a vehicle component whose integrity level corresponds at least to the current minimum integrity level and the one for which the greatest vehicle deceleration is obtained. The selected request signal is then set in the deceleration device by the control apparatus. Consequently, vehicle components having a sufficiently great or high integrity level do not influence or hamper one another when braking the motor vehicle.

According to one development, the deceleration performance is not limited for every braking process. The development provides for the time profile of the deceleration performance to be limited only if the vehicle deceleration has previously satisfied a predetermined emergency braking criterion at least once. As a result, the limitation is not active continuously but rather only if the emergency braking criterion has been satisfied. Consequently, gentle or light braking processes are not unnecessarily impaired by the control apparatus.

According to one development, the emergency braking criterion comprises the set vehicle deceleration exceeding a predetermined deceleration value (that is to say a negative acceleration) and/or a predetermined rate of deceleration change (that is to say a jolt or a buildup of deceleration). Optionally, the deceleration value is in a range from 4 m/s2 to 6 m/s2. The rate of deceleration change may be in a range from 4 m/s3 to 6 m/s3. Once the emergency braking criterion has been satisfied once, the conditional limitation described for the time profile can then be maintained or monitored up to the end of the braking process.

One development considers a change in the driving situation during the braking process. In this development, during the braking process, the ascertainment of the time profile is begun again if a predetermined restart event is identified. By way of example, the restart event can comprise the emergency braking criterion being satisfied during the braking process only after some time, that is to say at an interval of time from the beginning of the braking process. It is also possible for the restart event to be identified as being that a request signal from another vehicle component, which uses its request signal to request a greater vehicle deceleration than is currently set, is received. The development considers that, when monitoring the time profile of the characteristic curves too, can be used, which considers a time dependency of the deceleration performance.

According to one development, a beginning and/or an end of the braking process is identified on the basis of an activity signal from a brake light and/or on the basis of a minimum value for the vehicle deceleration. In other words, the braking process begins when the brake light lights and ends when the brake light goes out. Consequently, a braking process begun by a driver by means of the brake pedal is likewise recorded by the time signal. Additionally or alternatively, there may be provision for the braking process to be deemed as begun or ended on the basis of a minimum value for the vehicle deceleration. Thus, even if a driver leaves his foot on the brake pedal without causing significant vehicle deceleration, this is no longer rated as part of the braking process. When the braking process has ended, optionally no further minimum integrity level is prescribed. Consequently, a fresh beginning for a braking process is identified when a request signal is received again or additionally or in future.

As already explained, the disclosed embodiments also include the described control apparatus for the deceleration device of the motor vehicle. The control apparatus performs a disclosed embodiment of the method. To this end, the control apparatus can have a microcontroller or a microprocessor, for example. The control apparatus may be embodied as a braking controller.

Finally, the disclosed embodiments also include a motor vehicle in which a disclosed embodiment of the control apparatus is provided. The control apparatus is coupled to a deceleration device for setting a vehicle deceleration and to at least one vehicle component for receiving a request signal. The at least one vehicle component may have the control apparatus coupled to it via a communication bus, for example. The communication bus may be a CAN bus or a FlexRay bus, for example. A request signal from a brake pedal can be received by a pressure sensor on the brake pedal.

According to one development of the motor vehicle, the deceleration device comprises at least one of the following devices: an electrically controllable braking force booster for a friction brake, a generator for recuperating kinetic energy from the motor vehicle, an engine controller for performing engine braking. Consequently, the control apparatus for each of the comprised devices monitors whether the request signal is plausible or admissible.

According to one development, the at least one vehicle component comprises at least one of the following: a parking assistance system, an electronic stability control (ESC), an emergency braking assistant, a brake pedal, a recuperation controller for the generator described, an electromechanical braking force booster (eBKV), a multicollision brake for triggering full braking after a primary crash or initial crash, an assistance system for autonomous longitudinal guidance of the motor vehicle, a warning jolt device for generating a haptic warning signal for a driver. This results in monitoring of these vehicle components at vehicle level, that is to say not only within the respective component on the basis of its integrity level, that is to say its ASIL, for example. There is provision in this context for the brake pedal to have an associated integrity level that corresponds at least to the greatest or highest minimum integrity level.

There may be provision for one or more of the vehicle components described to communicate with the control apparatus not directly but rather indirectly, for example, via an added-convenience acceleration component that forwards the respective request signal from the vehicle component. Consequently, the setting of a time profile for the respective request signal can be filtered by the added-convenience acceleration component. There may alternatively be provision for an added-convenience acceleration component of this kind to be bypassed by the respective vehicle component and for the vehicle component to send its request signal directly to the control apparatus, for example, if a speed of travel of the motor vehicle is lower than a limit value. By way of example, the limit value may be in a range from 10 km/h to 20 km/h, for example, may be 15 km/h.

The disclosed motor vehicle may be a motorcar, such as, an automobile or truck.

In the exemplary embodiment, the components of the embodiment that are described are each individual features that can be viewed independently of one another and that each also develop independently of one another and hence can also be regarded as part of the embodiments individually or in a combination other than that shown. Furthermore, the embodiment described can also be augmented by further features that have already been described.

In the figures, elements having the same function are each provided with the same reference symbols.

Figure 1:
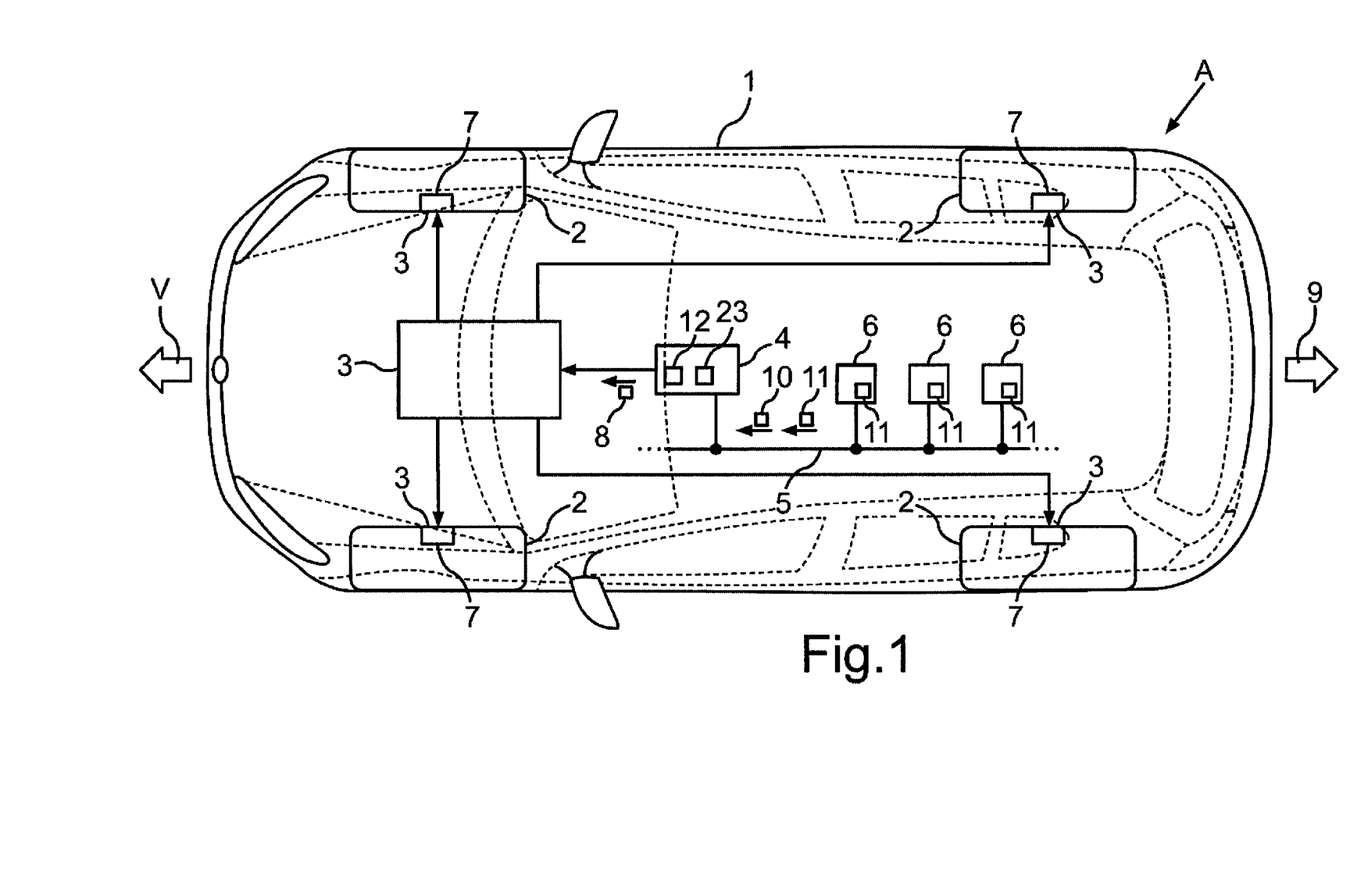
FIG. 1 shows a schematic illustration of a disclosed embodiment of the motor vehicle.

FIG. 1 shows a bird's eye view of a motor vehicle 1, which may be a motorcar, for example, an automobile or truck, for example. It shows wheels 2, a deceleration device 3, a control apparatus 4, a communication bus 5 and vehicle components 6. In the example shown in FIG. 1, the motor vehicle 1 rolls in a forward direction of travel at a speed of travel V.

By way of example, the deceleration device 3 can comprise friction brakes 7 for each wheel 2. Furthermore, the deceleration device 3 can also comprise a generator (not shown in more detail), for example, that can be driven via a drive train (not shown) by the wheels 2 when the motor vehicle 1 is rolling. With the deceleration device 3 activated, a speed of travel of the motor vehicle 1 is decreased, that is to say reduced to a standstill. In this case, the speed decrease or the speed reduction does not have to be effected completely to a standstill. The control apparatus 4 can generate a control signal 8 for the deceleration device 3.

FIG. 1 shows a braking process A in which the motor vehicle 1 is braked with a vehicle deceleration 9. To this end, the control apparatus 4 may have set a vehicle deceleration 9, that is to say an acceleration value or a braking torque that reduces the speed of travel V or counters the speed of travel V, for example. The braking process A may also have been initiated by operation of the brake pedal, for example.

The control apparatus 4 may be embodied as a braking controller, for example. The control apparatus 4 uses the control signal 8 to set the vehicle deceleration 9 in the deceleration device 3 on the basis of a request signal 10 that the control apparatus 4 can receive via the communication bus 5 from one of the vehicle components 6. To this end, the communication bus 5 may be embodied as a CAN bus or FlexRay bus, for example. The respective vehicle component 6 may be embodied as a driving assistance system, DAS, for example. There may also be provision for a driving assistance system to have multiple program modules or program functions, each of which is one of the vehicle components 6. Each vehicle component 6 can generate a respective request signal 10. The vehicle components may be the devices already described, that is to say a controller for an ACC or a parking assistance system or an emergency braking assistant, for example. The brake pedal is also a vehicle component 6, the request signal from the brake pedal describing the vehicle deceleration requested by the brake pedal.

In this case, the motor vehicle 1 has the assurance that even if a vehicle component 6 generates a request signal 10 that is based on a misidentification or a technical effect of the vehicle component 6, the corresponding vehicle deceleration 9 is nevertheless not set if it is a vehicle deceleration 9 that has a greater effect on the speed of travel V than is admissible for the vehicle component 6. To this end, each vehicle component 6 has an associated safety value or integrity level 11. By way of example, the integrity level 11 may be an ASIL, that is to say an ASIL-QM, ASIL-A, ASIL-B, ASIL-C or ASIL-D statement, for example. In this case, the following ascending level sequence is obtained: ASIL-QM, ASIL-A, ASIL-B, ASIL-C and ASIL-D.

Figure 2:
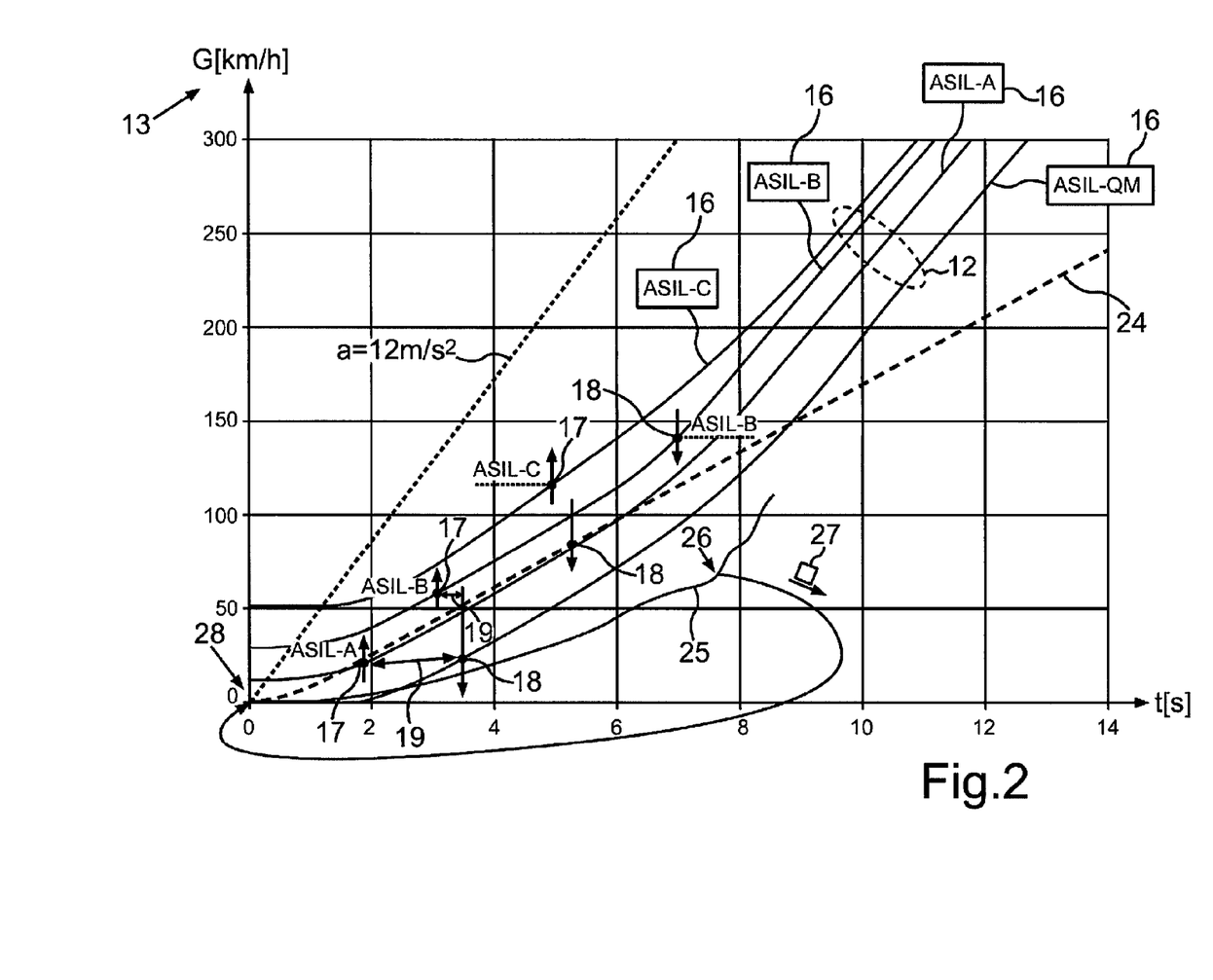
FIG. 2 shows a graph with characteristic curves for ascertaining a minimum integrity level on the basis of a time profile for a deceleration performance of a deceleration device of the motor vehicle.
Figure 3:
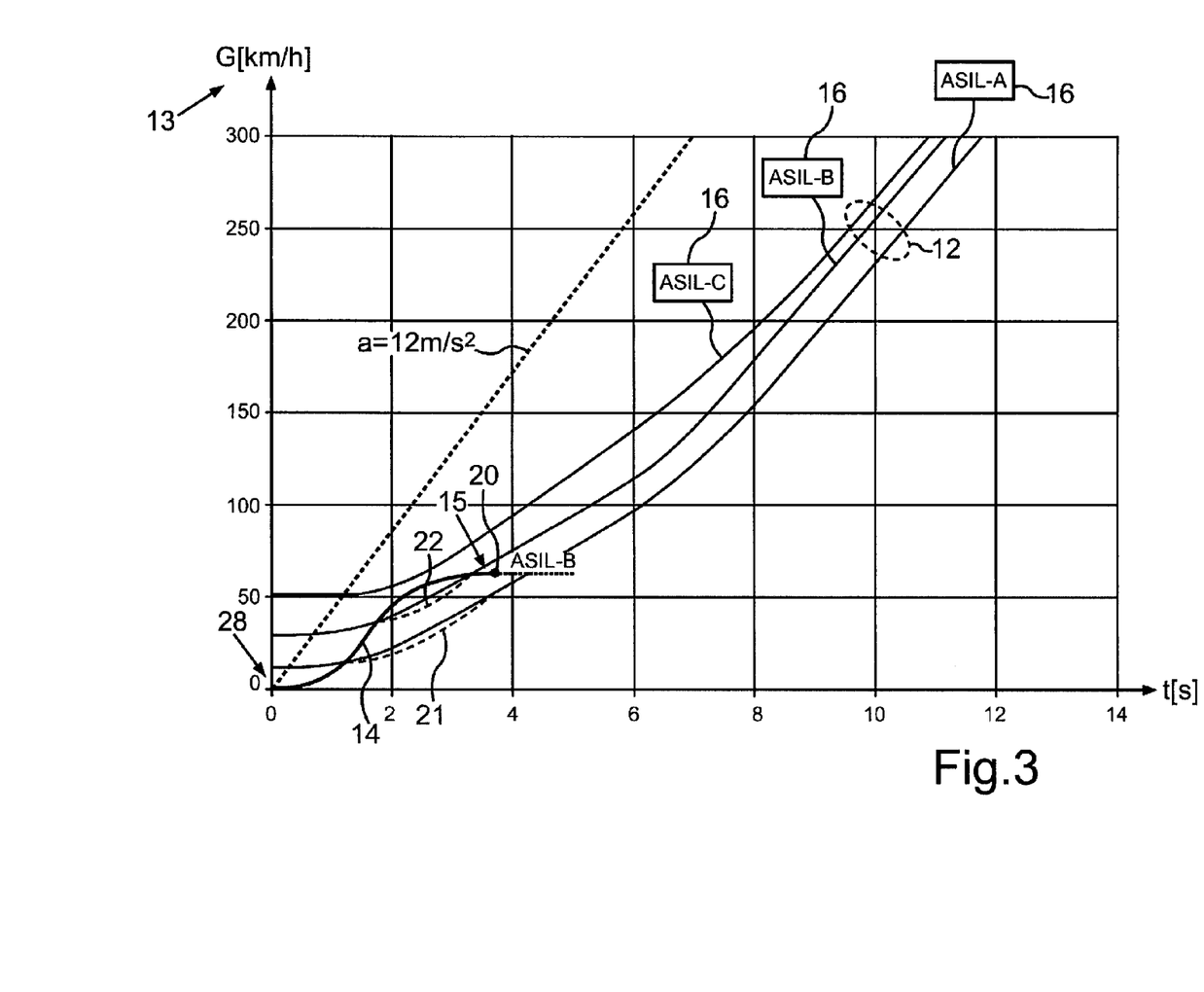
FIG. 3 shows a graph with the characteristic curves from FIG. 2 and an exemplary time profile for a deceleration performance during a braking process of the motor vehicle from FIG. 1.

FIG. 2 and FIG. 3 illustrate how the control apparatus 4 checks whether a request signal from a vehicle component 6 causes an admissible braking process A.

In this regard, FIG. 2 shows characteristic curves 12 that define performance limits over time t (shown in seconds s), which performance limits refer to a deceleration performance 13 that is admissible for the various integrity levels 11. For the further explanation of the exemplary embodiment, it is assumed that the deceleration performance 13 is the speed reduction G. The speed reduction G is indicated in the unit km/h in FIG. 2 and FIG. 3. For better orientation, a characteristic curve for full braking with a speed reduction for a vehicle deceleration 9 having a value a=12 m/s2 is likewise shown.

In FIG. 3, it is assumed by way of example that a request signal 10 has set a vehicle deceleration 9 that results, after 3 seconds, in a speed reduction, that is to say a reduced vehicle speed, of 60 km/h. Subsequently, the motor vehicle 1 continues to roll at a constant speed of travel V, which results in a horizontal profile 15 for the time profile 14. By way of example, the motor vehicle 1 may have been braked from 100 km/h to 40 km/h. The speed reduction G therefore describes the speed value by which the speed of travel V has been decreased since the beginning of recording of a time profile 14 (see FIG. 3) for the speed reduction G.

The characteristic curve 12 prescribes a respective minimum integrity level 16 that the vehicle component 6 needs to have so that it can actually request or prompt the time profile 14 with its request signal 10.

FIG. 2 shows that every exceeding 17 of one of the characteristic curves 12 prompts the associated minimum integrity level 16 to be set or selected or prescribed. Only in the event of a drop 18 below a characteristic curve 12 for a lower minimum integrity level 16 is there a return to this minimum integrity level 16. This results in a hysteresis 19 between the change of minimum integrity levels 16. In FIG. 3, the minimum integrity level 16 ASIL-B is therefore obtained for the time profile after 3 seconds in the horizontal profile 15 shown, at the evaluation time 20.

FIG. 3 furthermore illustrates alternative time profiles 21, 22. The reason is that the control apparatus 4 limits the time profile 14 on the basis of the integrity level 11 of the vehicle component 6 that sends the request signal 10 if the request signal 10 from the vehicle component 6 has hitherto been used by the control apparatus 4 to generate the control signal 8. The integrity level 11 can be ascertained by the control apparatus 4, for example, on the basis of a firm association 23 that indicates, for each vehicle component 6, its integrity level 11. There may also be provision for the vehicle component 6 to communicate or transfer or provide its integrity level 11, together with the request signal 10, to or for the control apparatus 4 via the communication bus 5.

If the integrity level 11 now indicates ASIL-QM, for example, for the vehicle component 6, then the alternative profile 21 of the time signal 14 is obtained. The reason for this is that the exceeding 17 of the characteristic curve 12 for the minimum integrity level 16 according to ASIL-A prompts it to be established that the vehicle component 6 has only an integrity level ASIL-QM, then the vehicle deceleration 9 is limited by the control apparatus 4 by means of the control signal 8. This keeps or limits the deceleration performance below the characteristic curve 12 for ASIL-A.

If the vehicle component 6 has the level ASIL-A as integrity level 11, then the deceleration performance, that is to say the time profile 14 for the speed reduction G, cannot exceed the characteristic curve 12 for the minimum integrity level 16 ASIL-B. Accordingly, decreasing the vehicle deceleration 9 results in the alternative profile 22. The characteristic curves 12 are therefore performance limits that are selected on the basis of the time profile 14.

The performance limits, that is to say the characteristic curves 12, are not permanently active. It is first of all necessary for an emergency braking criterion 24 to be satisfied. The emergency braking criterion 24 is illustrated graphically in FIG. 2. By way of example, it may state that the vehicle deceleration 9 has to be greater than 5 m/s2 and/or the change of deceleration, that is to say the jolting of the motor vehicle 1, has to be greater than 5 m/s3. Only then are the characteristic curves 12 activated, that is to say is the vehicle deceleration 9 actually limited.

The time profile 14 is first of all recorded from the beginning of the braking process, that is to say when the deceleration device 3 is activated. By way of example, recording of the time profile 14 can be begun if an activity signal from brake lights of the motor vehicle 1 signals an activity or lighting of the brake lights. FIG. 2 illustrates how a time profile 25 first of all effects a light braking process up to approximately 7.5 seconds, which braking process does not satisfy the emergency braking criterion 24. A change of situation 26, for example, can trigger a restart event 27 that can be identified by the control apparatus 4. By way of example, it may be a rise in the vehicle deceleration 9 that is greater than 5 m/s2. Recording of the time profile 25 is then begun again, so that the change of situation 26 is shifted to the origin 28 of the graph in FIG. 2. The detection of the restart event 27 may also be limited to that case in which the time profile 25 has hitherto been or resided below the characteristic curve 12 for the minimum integrity level 16 ASIL-QM.

While one of the minimum integrity levels 16 is set, further or other request signals 10 from other vehicle components 6 are ignored if their integrity level 11 is lower or less than the currently set or selected minimum integrity level 16. The currently selected minimum integrity level 16 can be indicated to the vehicle components 6 in a return channel. The control apparatus 4 therefore takes the currently ascertained speed reduction G and the set current minimum integrity level 16 as a basis for terminating the deceleration requested by vehicle components 6 by means of the control apparatus 4.

The control apparatus 4 therefore monitors the limits of the deceleration performance for each vehicle component 6, including when multiple request signals 10 are superimposed and even in the event of braking by the driver by means of the brake pedal. The basis for this is the integrity level 11 of the respective vehicle component 6. Provided that the motor vehicle 1 has been decelerated to a predetermined ASIL range above one of the characteristic curves 12 by the control apparatus 4, a return of the availability, for example, to ASIL-QM, is delimited, as a result of the hysteresis 19 described, only after some time in the event of a drop 18 below the relevant characteristic curve 12. Since all vehicle components have at least the integrity level ASIL-QM, the characteristic curve 12 for the minimum integrity level 16 ASIL-QM serves only as a return criterion for setting the minimum integrity level 16 ASIL-QM. The characteristic curve can be built by shifting the characteristic curve ASIL-A by 0.5 s and by −15 km/h, for example.

The safety concept described is valid at vehicle level and should be applied to all vehicle components, that is to say driving assistance systems or assistance functions, that are able to decelerate. These are firstly ESC-internal vehicle components or functions and secondly the recuperation and an added-convenience acceleration interface, which in turn can receive request signals from other vehicle components, such as an ACC, for example. This should be considered in the safety concept. Further future braking functions that can be realized using an electronic braking force booster, for example, should also be safeguarded by the safety concept.

Overall, the example shows how the disclosed embodiments can provide a generic safety concept to avoid overbraking at vehicle level.

LIST OF REFERENCE SYMBOLS

1 Motor vehicle
2 Wheels
3 Deceleration device
4 Control apparatus
5 Communication bus
6 Vehicle components
7 Friction brake
8 Control signal
9 Vehicle deceleration
10 Request signal
11 Integrity level
12 Characteristic curve
13 Deceleration performance
14 Time profile
15 Horizontal profile
16 Minimum integrity level
17 Exceeding
18 Dropping below
19 Hysteresis
20 Evaluation time
21 Alternative profile
22 Alternative profile
23 Firm association
24 Emergency braking criterion
25 Time profile
26 Change of situation
27 Restart event
28 Origin
t Time
A Braking process
G Speed reduction
V Speed of travel

The invention claimed is:

1. A method for controlling a deceleration device of a motor vehicle, the method comprising:
   at a beginning of or during a braking process in which the deceleration device prompts vehicle deceleration, a control apparatus receiving a request signal from a vehicle component for the vehicle deceleration;
   the control apparatus ascertaining an integrity level of the vehicle component,
   the control apparatus ascertaining, during the braking process, a time profile for deceleration performance of the deceleration device obtained as a result of the vehicle deceleration,
   the control apparatus ascertaining, for different times, a respective current minimum integrity level that is at least necessary for the time profile ascertained hitherto, and the control apparatus performing performance limitation for the request signal in response to the current minimum integrity level being higher than the integrity level of the vehicle component.

2. The method of claim 1, wherein the performance limitation comprises the request signal being ignored or the time profile of the deceleration performance being limited to a performance limit prescribed by the current minimum integrity level by virtue of the vehicle deceleration requested by the request signal being decreased and only the decreased vehicle deceleration being set in the deceleration device in response to the vehicle deceleration requested by the request signal exceeding the performance limit.

3. The method of claim 1, wherein the deceleration performance comprises a speed reduction for the speed of travel of the motor vehicle since the beginning of the time profile.

4. The method of claim 1, wherein the integrity level indicates a probability of error for erroneous generation of the request signal.

5. The method of claim 1, wherein a respective characteristic curve for the time profile of the deceleration performance is prescribed for multiple prescribed minimum integrity levels, and of the minimum integrity levels, the one whose characteristic curve has been exceeded by the ascertained time profile most recently is selected as the current minimum integrity level.

6. The method of claim 5, wherein the current minimum integrity level is maintained until the ascertained time profile has dropped below the characteristic curve of a lower minimum integrity level, and then the lower minimum integrity level is selected as the current minimum integrity level.

7. The method of claim 1, wherein during the braking process, of multiple received request signals, the one selected is the one received from a vehicle component whose integrity level corresponds at least to the current minimum integrity level and the one for which the greatest vehicle deceleration is obtained.

8. The method of claim 1, wherein the time profile is limited only in response to the vehicle deceleration having previously satisfied a predetermined emergency braking criterion at least once.

9. The method of claim 8, wherein the emergency braking criterion comprises the set vehicle deceleration exceeding a predetermined deceleration value and/or a predetermined rate of deceleration change.

10. The method of claim 1, wherein during the braking process, the ascertainment of the time profile is begun again in response to a predetermined restart event is identified.

11. The method of claim 1, wherein a beginning and/or an end of the braking process is identified based on an activity signal from a brake light and/or based on a minimum value for the vehicle deceleration.

12. A control apparatus for a deceleration device of a motor vehicle, wherein the control apparatus:
receives, at a beginning of or during a braking process in which the deceleration device prompts vehicle deceleration, a request signal from a vehicle component for the vehicle deceleration;
ascertains an integrity level of the vehicle component,
ascertains, during the braking process, a time profile for deceleration performance of the deceleration device obtained as a result of the vehicle deceleration,
ascertains, for different times, a respective current minimum integrity level that is at least necessary for the time profile ascertained hitherto, and
performs performance limitation for the request signal in response to the current minimum integrity level being higher than the integrity level of the vehicle component.

13. The control apparatus of claim 12, wherein the performance limitation comprises the request signal being ignored or the time profile of the deceleration performance being limited to a performance limit prescribed by the current minimum integrity level by virtue of the vehicle deceleration requested by the request signal being decreased and only the decreased vehicle deceleration being set in the deceleration device in response to the vehicle deceleration requested by the request signal exceeding the performance limit.

14. The control apparatus of claim 12, wherein the deceleration performance comprises a speed reduction for the speed of travel of the motor vehicle since the beginning of the time profile.

15. The control apparatus of claim 12, wherein the integrity level indicates a probability of error for erroneous generation of the request signal.

16. The control apparatus of claim 12, wherein a respective characteristic curve for the time profile of the deceleration performance is prescribed for multiple prescribed minimum integrity levels, and of the minimum integrity levels, the one whose characteristic curve has been exceeded by the ascertained time profile most recently is selected as the current minimum integrity level.

17. The control apparatus of claim 16, wherein the current minimum integrity level is maintained until the ascertained time profile has dropped below the characteristic curve of a lower minimum integrity level, and then the lower minimum integrity level is selected as the current minimum integrity level.

18. The control apparatus of claim 12, wherein during the braking process, of multiple received request signals, the one selected is the one received from a vehicle component whose integrity level corresponds at least to the current minimum integrity level and the one for which the greatest vehicle deceleration is obtained.

19. The control apparatus of claim 12, wherein the time profile is limited only in response to the vehicle deceleration having previously satisfied a predetermined emergency braking criterion at least once.

20. The control apparatus of claim 19, wherein the emergency braking criterion comprises the set vehicle deceleration exceeding a predetermined deceleration value and/or a predetermined rate of deceleration change.

21. The control apparatus of claim 12, wherein during the braking process, the ascertainment of the time profile is begun again in response to a predetermined restart event is identified.

22. The control apparatus of claim 12, wherein a beginning and/or an end of the braking process is identified based on an activity signal from a brake light and/or based on a minimum value for the vehicle deceleration.

23. A motor vehicle having a control apparatus that is coupled to a deceleration device for setting a vehicle deceleration and to at least one vehicle component for receiving a request signal, the control apparatus:
receiving, at a beginning of or during a braking process in which the deceleration device prompts vehicle deceleration, a request signal from a vehicle component for the vehicle deceleration;

ascertaining an integrity level of the vehicle component, ascertaining, during the braking process, a time profile for deceleration performance of the deceleration device obtained as a result of the vehicle deceleration, ascertaining, for different times, a respective current minimum integrity level that is at least necessary for the time profile ascertained hitherto, and performing performance limitation for the request signal in response to the current minimum integrity level being higher than the integrity level of the vehicle component.

24. The motor vehicle of claim 23, wherein the deceleration device comprises at least one of the following devices: an electrically controllable braking force booster for a friction brake, a generator for recuperating kinetic energy from the motor vehicle, an engine controller for performing engine braking.

25. The motor vehicle of claim 23, wherein the at least one vehicle component comprises at least one of the following: a parking assistance system, an electronic stability control, an emergency braking assistant, a brake pedal, a recuperation controller, an electromechanical braking force booster, a multicollision brake for triggering full braking after a primary crash, an assistance system for autonomous longitudinal guidance of the motor vehicle, a warning jolt device for generating a haptic warning signal for a driver.

* * * * *